May 5, 1925.
W. F. FOLMER
1,536,335
AIR PRESSURE FILM HOLDER FOR AVIATION CAMERAS
Filed Dec. 9, 1922  2 Sheets-Sheet 1
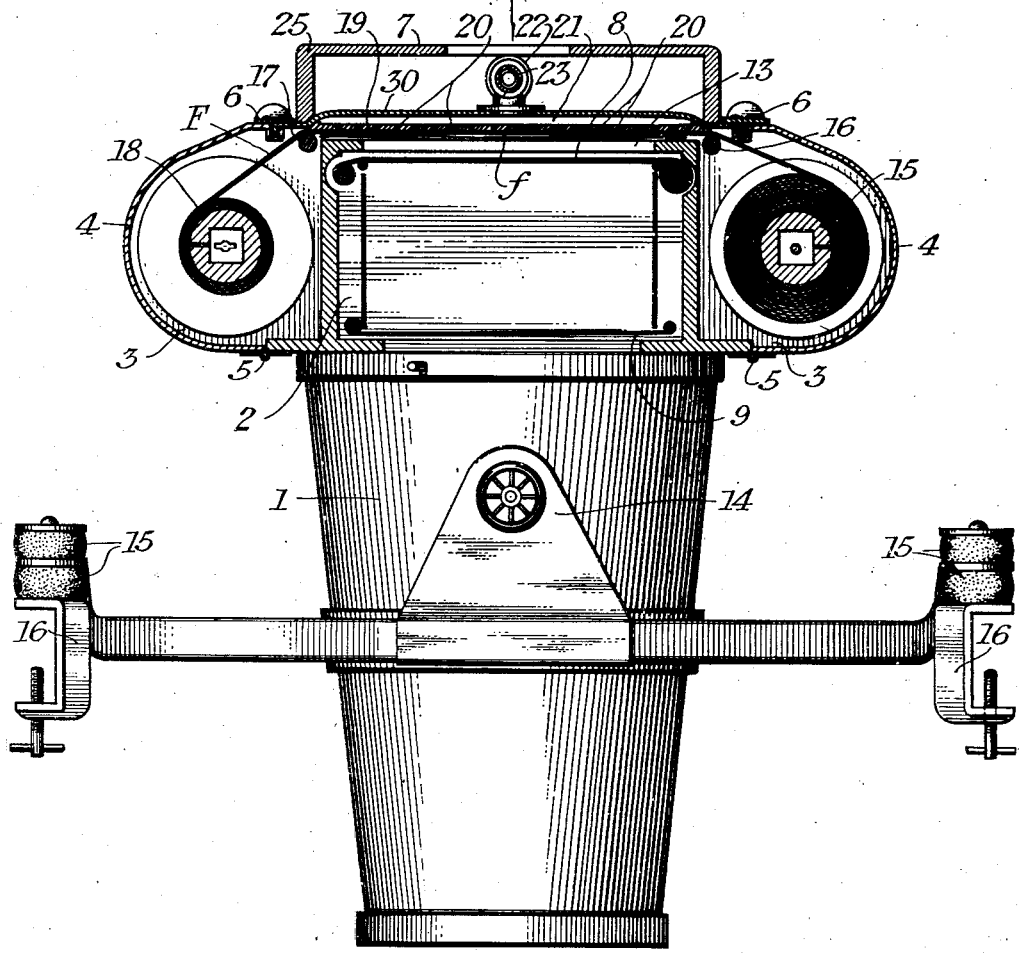
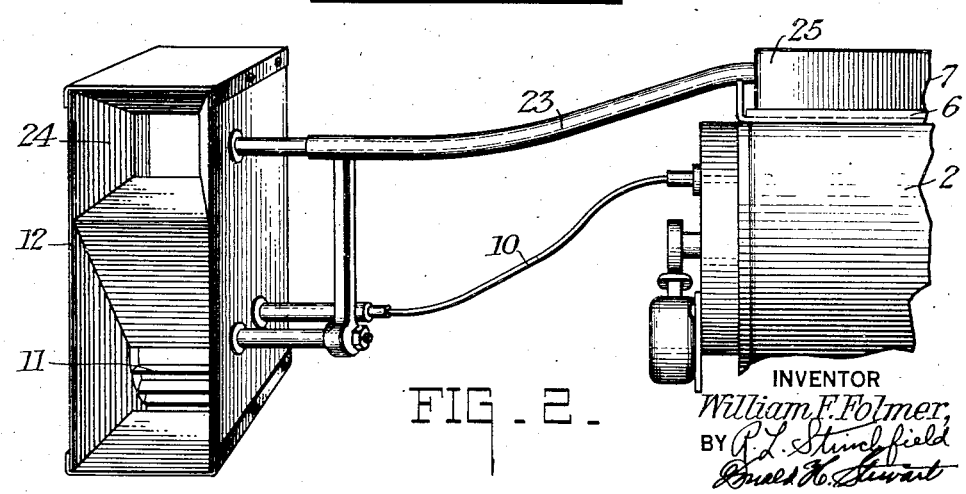
INVENTOR
William F. Folmer,
BY
ATTORNEY May 5, 1925. 1,536,335
W. F. FOLMER
AIR PRESSURE FILM HOLDER FOR AVIATION CAMERAS
Filed Dec. 9, 1922 2 Sheets-Sheet 2

INVENTOR
William F. Folmer,
BY
ATTORNEY

Patented May 5, 1925.

1,536,335

UNITED STATES PATENT OFFICE.

WILLIAM F. FOLMER, OF ROCHESTER, NEW YORK, ASSIGNOR TO EASTMAN KODAK COMPANY, OF ROCHESTER, NEW YORK, A CORPORATION OF NEW YORK.

AIR-PRESSURE FILM HOLDER FOR AVIATION CAMERAS.

Application filed December 9, 1922. Serial No. 605,991.

*To all whom it may concern:*

Be it known that I, WILLIAM F. FOLMER, a citizen of the United States of America, residing at Rochester, in the county of Monroe and State of New York, have invented certain new and useful Improvements in Air-Pressure Film Holders for Aviation Cameras, of which the following is a full, clear, and exact specification.

This invention relates to photography and more particularly to photographic cameras having particular reference to mapping cameras used in aeroplanes or other flying machines. The improvements relate particularly to the mechanism used for holding the film accurately in the focal plane of the lens; to means for holding it flat through air pressure; to means for automatically controlling the force of the air; and to means for adjusting the air control to vary the force used as may be found necessary. To these and other ends the invention resides in certain improvements and combination of parts, all as will be hereinafter more fully described, the novel features being pointed out in the claims at the end of the specification.

This invention is an improvement upon the automatic aeroplane camera shown in my Patent No. 1,309,798, patented July 15, 1919, so that reference may be had to this patent for the positioning of the camera in the aeroplane, and for other camera details not within the scope of this invention.

I have found in practice that the suction produced by a Venturi tube, such as is shown in my patent referred to above varies within very wide limits, due to wind pressure, power of the aeroplane motors, speed of the machine and other variables. In a few cases the film has been torn because the suction held the film tightly against the camera back while the motor take-up mechanism attempted to wind up the film. For some classes of work the film is preferably moved continuously even during exposures, and for this type of work the vacuum must be just sufficient to hold the film flat and yet permit it to move with sufficient freedom to prevent tearing. This invention is designed to overcome the above difficulties due to a lack of constant air pressure, and comprises an automatic air valve attached, preferably to the camera suction plate, through which air is exhausted for holding the film in the focal plane. It is obvious that it can also be applied to cameras in which a Venturi tube is not used, as it is applicable to other types of air pumps, and it may also be used wherever air pressure is used to hold a photographically sensitive surface in a predetermined position.

In the drawings, in which like reference characters denote like parts throughout:

Fig. 1 is a part section and part elevation of a camera built in accordance with and illustrating one form of my invention;

Fig. 2 is a fragmentary end view of parts of the camera including the source of power;

Figure 3:
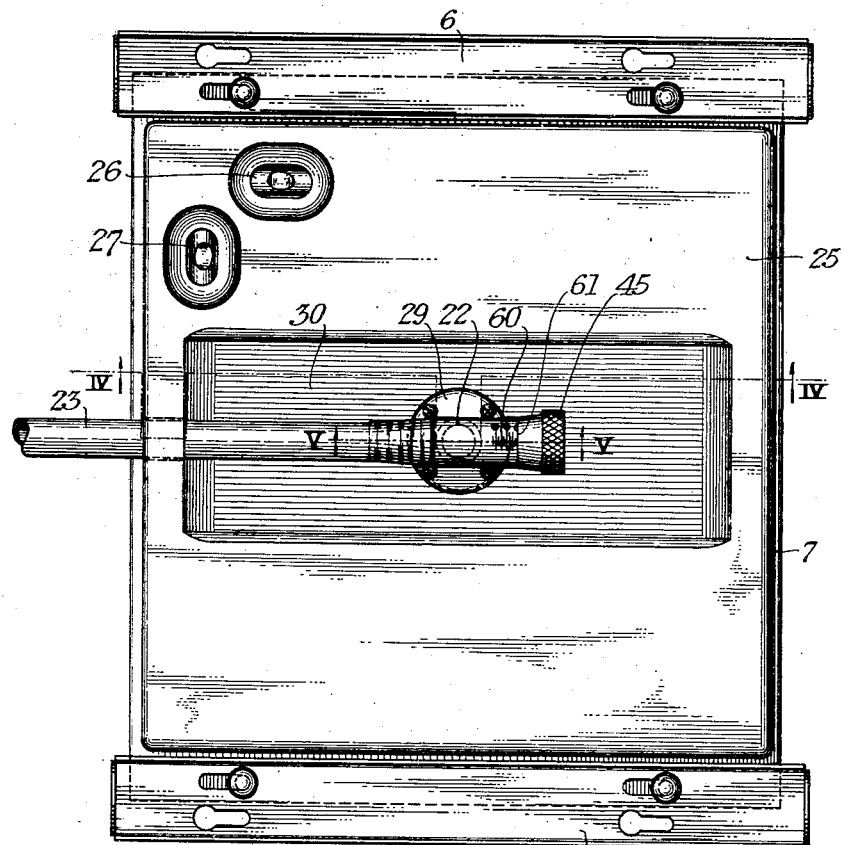
Fig. 3 is an enlarged top plan of the camera back removed from the camera.
Figure 4:
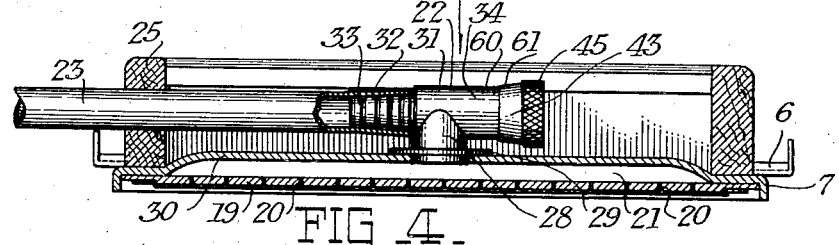
Fig. 4 is a section on line IV—IV of Fig. 3.

As the details of a substantially similar mapping camera are fully described in my Patent No. 1,309,798 above referred to, only such references will be made to the general camera structure as are necessary to understand the application of my present invention.

The camera, as shown in Fig. 1 consists of a cone 1 in which there is an objective which is not shown. Upon the cone there is mounted the camera body 2, there being spool chambers 3—3 at each end of the body. End walls 4—4 are hinged at 5—5 to the body and are latched by the slidable bars 6—6 opposite the hinges, so that the film spools are loaded by opening the ends, and removing the camera back 7.

A focal plane shutter 8 is shown in this embodiment of my invention and a protecting curtain shutter 9 is also mounted in the body 2. These shutters are operated through a flexible cable 10 connected to a wind motor 11 contained in housing 12, and are geared together so that shutter 9 closes only while the slot of the focal plane shutter is being wound across the exposure frame 13 for setting, after which shutter 9 opens until after the main shutter makes the exposure. These features are not at all essential to my invention, for, if desired, another type of shutter, as a between-the-lens shutter, can be conveniently used in the place of the focal plane shutter.

The camera is mounted in a gimbal frame 14 which in turn is supported between resilient pads 15. These pads are carried by clamps 16 which are attached to the aeroplane body.

Coming now to my invention, the film F is drawn from a supply spool 15 across roller 16, the exposure frame 13, across a second roller 17, and is finally wound upon spool 18. A flat metal plate 19 forms a part of the camera back 7; and is perforated at intervals over its entire film contacting surface, as indicated by the numerals 20. The film F is adapted to lie against this plate with the photographically sensitive surface $f$ in the focal plane of the objective. In order to hold the film against the plate I provide an air chamber 21 connected through valve 22 and a pipe 23 to any suitable air pump, here shown as a Venturi tube 24. This tube rarifies the air in chamber 21 sucking the film flat upon plate 19. The box 25 protects the air piping and also provides a convenient seat for the camera levels 26 and 27.

Figures 5, 6:
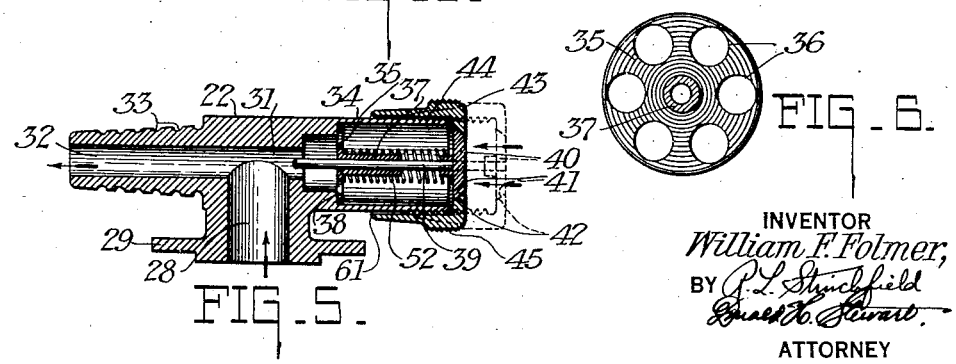
Fig. 5 is a section on line V—V of Fig. 3.
Fig. 6 is a sectional view of a part of the valve shown in Fig. 5.

As best shown in Figs. 5 and 6, the valve 22 consists of an upright tube 28 having a flange 29 attached to plate 30 which forms the upper wall of the air chamber 21, and having a tubular shaped cross head 31. End 32 is grooved at 33 for attaching to the air pipe 23, and end 34 contains the automatic air pressure regulator. A disk 35 perforated at 36 is provided with a sleeve 37, and is seated upon the shoulder 38 in end 34. Sleeve 37 forms a guideway and bearing for a rod 39 supporting a valve head 40 which has a beveled edge 41. A spring 52 surrounds sleeve 37 as a guideway and presses outwardly upon the head 40.

The outward movement of 40 is limited by a beveled aperture 42 of the cap 43 which has a threaded engagement at 44 with the tubular end 34, there being preferably a knurled surface 45 by which the cap may be adjusted. As is obvious by moving the cap from its extreme outward position—dashed lines Fig. 6—to its extreme inward position—full lines in the same figure—a considerable variation in the compression of spring 52 can be obtained, and consequently more or less air may be passed through this vent, according to the setting of cap 43.

A scale 60, graduated into any desired units of pressure, is placed on the outside of the valve housing, and an edge 61 of the cap 43 serves as a pointer from which the setting may be read (Fig. 3).

The operation of my device is as follows: The air drawn continuously by the pump or exhauster 24 through the pipe 23 and valve 22 holding the film F flat against plate 19. When the air pressure is too great for the successful operation of the camera, or when there is more pressure than is desirable, the air pressure will, by compressing spring 52, admit air between the valve head 40 and seat 42 thus relieving the film of the excess pressure, and thus keeping the pressure constant automatically since obviously the spring will immediately close the vent when the pressure drops. This valve also permits the pressure to be adjusted as may be necessary to suit different conditions, and any pressure can be repeated at will by merely setting the pointer at the desired graduation of the dial. The most important feature of the automatic air regulator, however, is that the air pressure used for holding the film flat is always the same, so that wind puffs and other variations in the air currents met with in a single flight are automatically cared for without attention from the operator.

Having thus described my invention what I claim as new and desire to secure by Letters Patent is:

1. In an aerial camera, the combination with a film exposing chamber, of a plate against which a film may lie with the sensitive side in the focal plane, means for holding the film against the plate by air pressure and means associated with the first mentioned means for automatically controlling the force of the air pressure which holds the film flat.

2. In an aerial camera, the combination with a film exposing chamber, of a plate therein against which film may lie with the sensitive side in the focal plane, means for providing a variable air pressure for forcing the film flat against the plate, and an adjustable valve connected to the means for providing air pressure for the film by which the variable air pressure is controlled so as to exert a non-varying force on the film.

3. In an aerial camera, the combination with an air chamber, one side of the chamber comprising a plate against which a film may lie with the sensitive side in the focal plane, of an air pipe connected to the chamber, means for creating a variable pressure on the air passing through this pipe, and means also connected to the air pipe for regulating the air pressure in the pipe whereby an even pressure will be exerted on the film causing it to lie flat on the plate.

4. In an aerial camera, the combination with an air chamber, one side of which comprises a plate on which a film may lie in the focal plane, an air pipe connected to the air chamber at one end, and to an air exhauster at the other end, and means for regulating the air pressure connected to the pipe between the ends thereof.

5. In an aerial camera, the combination with an air chamber, of a plate associated therewith having one surface on which a film may lie in the focal plane, an air pipe leading to the air chamber, an air pump connected to the air pipe, and an air valve by which the air pressure can be regulated, a scale and an adjustable member movable over to scale by which the valve may be set to regulate the air pressure in the air chamber to a predetermined degree.

6. In an aerial camera, the combination with an air chamber, of a perforated plate against which the film may lie flat in the focal plane, an air pump for drawing the air through the perforations in the plate, and means for predetermining the force of the air in the perforations.

7. In an aerial camera, the combination with spool chambers, of film carried by spools situated in the chambers, means for moving the film past the exposure aperture, a plate against which the film is adapted to lie when in the focal plane, mechanism for holding the film against the plate by air pressure, and means for limiting the force of the air pressure to such a degree that the film winding mechanism may move the film while the film is retained in the focal plane by the constant air pressure.

8. In an aerial camera, the combination with a plate against which the film is adapted to lie in the focal plane, of an air pressure system for holding the film against the plate, an air regulating valve for the air system comprising a tubular member, a cap on the end of the tubular member adjustable axially thereon, an air vent in the end of the cap, a spring for holding the air vent closed, said spring being tensioned more or less by moving the cap axially of the tubular member.

9. In an aerial camera, the combination with a perforated plate against which the film is adapted to lie flat in the focal plane, of an air exhauster, an air pipe between the air exhauster and the perforated plate whereby the former may draw air through the perforations in the plate, a valve connected with the air pipe between the exhauster and the plate, means for setting the valve to a predetermined air pressure, said valve admitting air to the air pipe when the air pressure between the exhauster and the plate is greater than the valve setting, whereby an even pressure is secured through the perforations in the plate.

Signed at Rochester, New York, this 6th day of December, 1922.

WILLIAM F. FOLMER.